United States Patent
Liu (10) Patent No.: US 7,349,350 B2
(45) Date of Patent: Mar. 25, 2008

(54) DETERMINING TWO NODE-DISJOINT PATHS USING ON-DEMAND FLOODING

(75) Inventor: Changwen Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 871 days.

(21) Appl. No.: 10/670,052

(22) Filed: Sep. 23, 2003

(65) Prior Publication Data

US 2005/0063312 A1    Mar. 24, 2005

(51) Int. Cl.
*H04L 12/28* (2006.01)
(52) U.S. Cl. .................. 370/255; 370/238; 370/248; 370/400
(58) Field of Classification Search ............... 370/351, 370/400, 401, 254, 255, 238, 248
See application file for complete search history.

(56) References Cited

U.S. PATENT DOCUMENTS

| 6,061,736 | A  | * | 5/2000  | Rochberger et al.  | 709/241 |
| 6,751,746 | B1 | * | 6/2004  | Jain et al.        | 714/4   |
| 7,046,634 | B2 | * | 5/2006  | Wong et al.        | 370/238 |
| 2004/0022224 | A1 | * | 2/2004 | Billhartz         | 370/338 |
| 2005/0036486 | A1 | * | 2/2005 | Sahinoglu et al.  | 370/389 |
| 2005/0243757 | A1 | * | 11/2005 | Yagyu et al.      | 370/328 |
| 2006/0221834 | A1 | * | 10/2006 | Schollmeier et al. | 370/238 |

\* cited by examiner

*Primary Examiner*—Chirag G. Shah
*Assistant Examiner*—Gary Mui
(74) *Attorney, Agent, or Firm*—Schwabe, Williamson & Wyatt, P.C.

(57) ABSTRACT

The present disclosure relates to determining and establishing at least two node disjoint paths, and, more specifically, to determining and establishing at least two node disjoint paths within a wireless ad-hoc network that includes a source and a target node using on-demand flooding.

25 Claims, 12 Drawing Sheets

DETERMINING TWO NODE-DISJOINT PATHS USING ON-DEMAND FLOODING

BACKGROUND

1. Field

The present disclosure relates to determining and establishing at least two node disjoint paths, and, more specifically, to determining and establishing at least two node disjoint paths within a wireless ad-hoc network that includes a source and a target node using on-demand flooding.

2. Background Information

Typically communication between two nodes within an ad-hoc wireless network is accomplished utilizing a single communication path. However, the reliability and the throughput of communication between the two nodes may be increased and the load balance may be improved if multiple communication paths are used. Often, multi-path routing in an ad-hoc wireless network may establish multiple paths between source and destination nodes.

Communication paths may be considered as being comprised of a number of path segments, or links. Each path segment connects two nodes. These path segments may be connected in series to, ultimately, connect a specific source node with a specific target node. A communication from the source node may leap from node to node via the path segments until it reaches the target, or destination, node.

Multi-path routing is generally classified into two categories: link-disjoint and node-disjoint. In the link-disjoint scheme, the multiple paths typically do not share path segments, or links. For example, a first path may include a path segment from node-A to node-B, i.e. a node-A:B path segment. As a result, any other paths would not include the node-A:B path segment. However, a path could include a node-AC path segment. In the node-disjoint scheme, the multiple paths do not share nodes. For example, a first path may include a path segment from node-A to node-B. As a result, any other paths would not include either nodes A or B.

Both types of multipath routing schemes may provide benefits for the communicating source-destination node pair. Some benefits may include: high reliability, load balancing, and an end-to-end throughput improvement; however, other benefits may occur. Often a node disjoint multipath routing scheme may provide better protection against node failure than link disjoint routing.

BRIEF DESCRIPTION OF THE DRAWINGS

Subject matter is particularly pointed out and distinctly claimed in the concluding portions of the specification. The disclosed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as to not obscure the disclosed subject matter.

Figure 1:
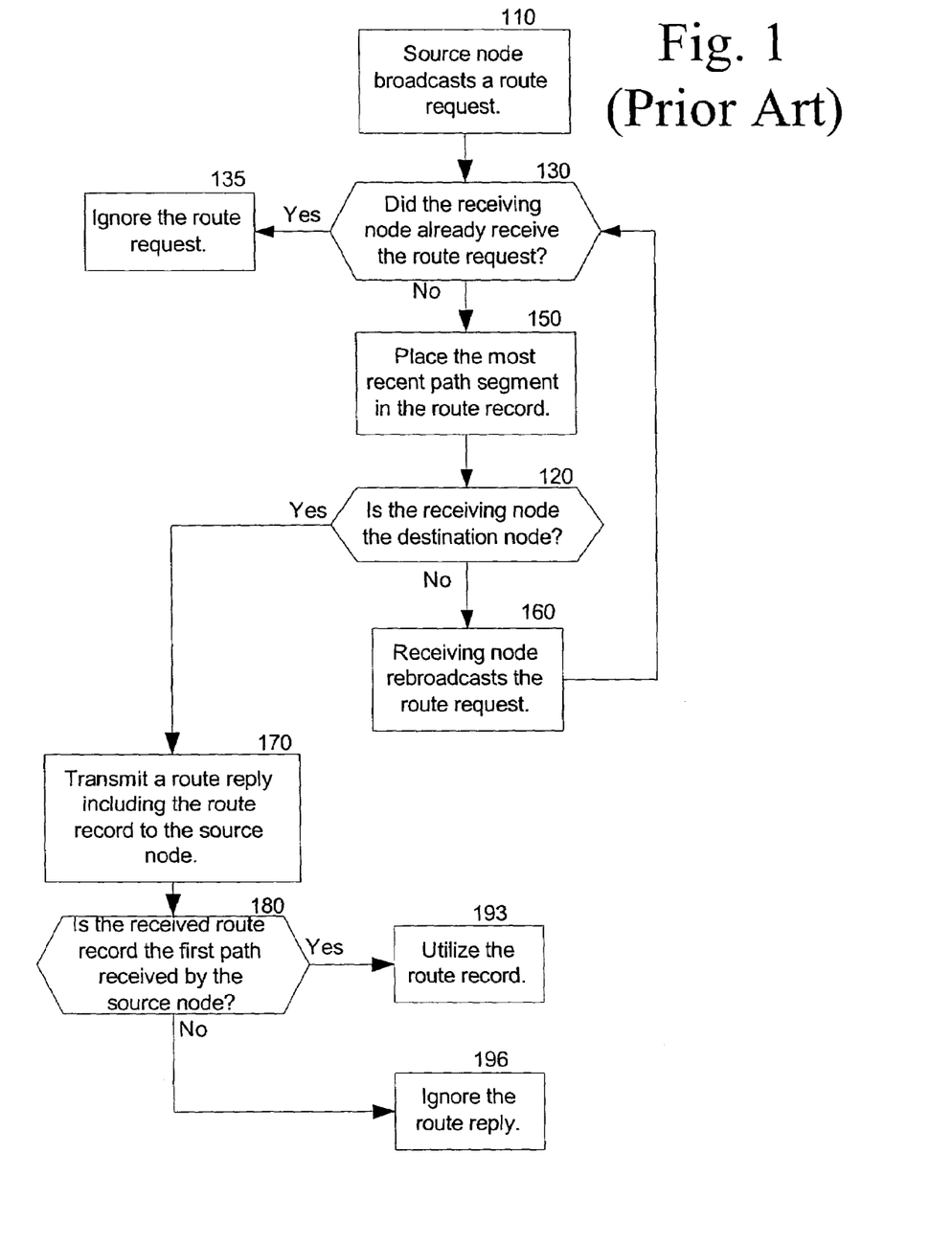
FIG. 1 is a flowchart illustrating an embodiment of a technique for establishing a communication path in accordance with the Dynamic Source Routing (DSR) protocol.
Figure 2:
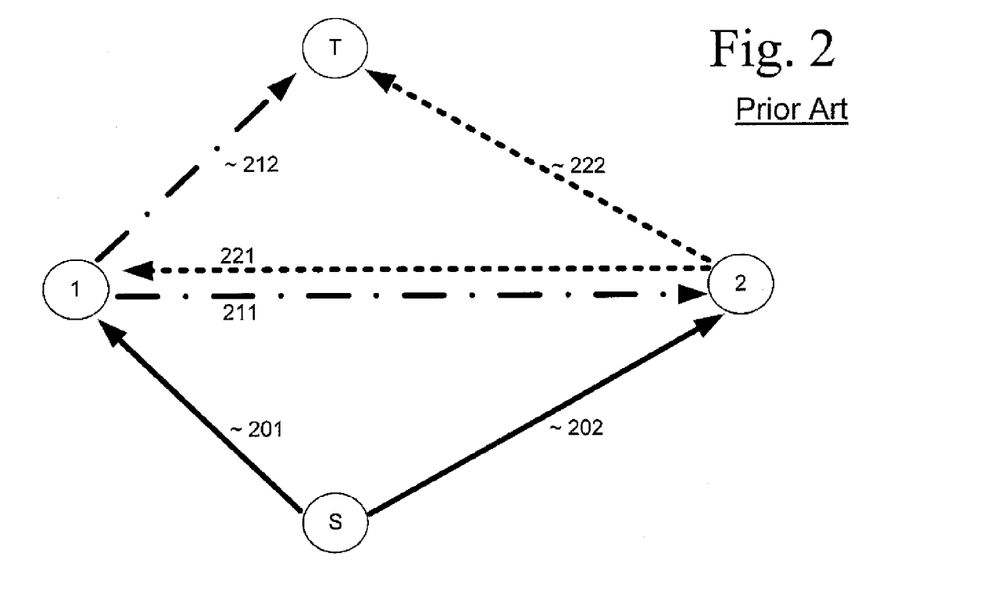
FIG. 2 is a block diagram illustrating an embodiment of a system of nodes that maybe include a path in accordance with the DSR or the disclosed subject matter.

FIG. 1 is a flowchart illustrating an embodiment of a technique for establishing a communication path in accordance with the Dynamic Source Routing (DSR) protocol. Block 110 illustrates that a source node, that wishes to establish a communication between the source node and the target node, may broadcast a route request. In one context, a request may be an omni-directional wireless transmission intended to be received by any nodes within the source nodes broadcasting range. Such a request is often referred to as a "flood." FIG. 2 illustrates a system that may utilize a routing discover protocol. Node S may wish to communicate with node T. It may establish a path by broadcasting a request to establish a path to all nodes within broadcast range, such as, nodes 1 and 2. The initial broadcast from node S may include broadcasts 201 and 202.

Block 130 illustrates that the receiving node may determine if it has already received a route request by the source node for the target node. If not, block 150 illustrates that the path segment may be placed within the route request, i.e. attach the current node to the end of the route record (a.k.a.

path). A path segment, in this context, is a portion of a path bounded by two nodes. In the example illustrated by FIG. 2, node 1 may receive broadcast 201. Since node 1 is not the target node, and since broadcast 201 is the first route request, node 1 may place path segment S:1 in a route request by attaching the node S to the end of the route record in the route request.

Block 120 of FIG. 1 illustrates that the receiving node may determine if it is the target node. If not, block 160 of FIG. 1 illustrates that the receiving node may rebroadcast the route request. In the example illustrated by FIG. 2, node 1 may rebroadcast the route request to nodes 2 and T, via broadcasts 211 and 212, respectively. In some embodiments, node 1 may also broadcast to node S. In other embodiments, node 1 may realize that node S is already in the route request and not broadcast to it. Likewise, node 2 may undergo the same technique as node 1, and rebroadcast the request to nodes 1 and T, via broadcasts 221, and 222, respectively.

Block 135 of FIG. 1, illustrates that if the route request was already received by the receiving node the request may be ignored. In the example illustrated by FIG. 2, when node 1 receives broadcast 221, it may be ignored because the route request was already received via broadcast 201. Likewise, node 2 may ignore broadcast 211. In some embodiments, node T may ignore broadcast 222 if it receives broadcast 212 first.

Figure 3:
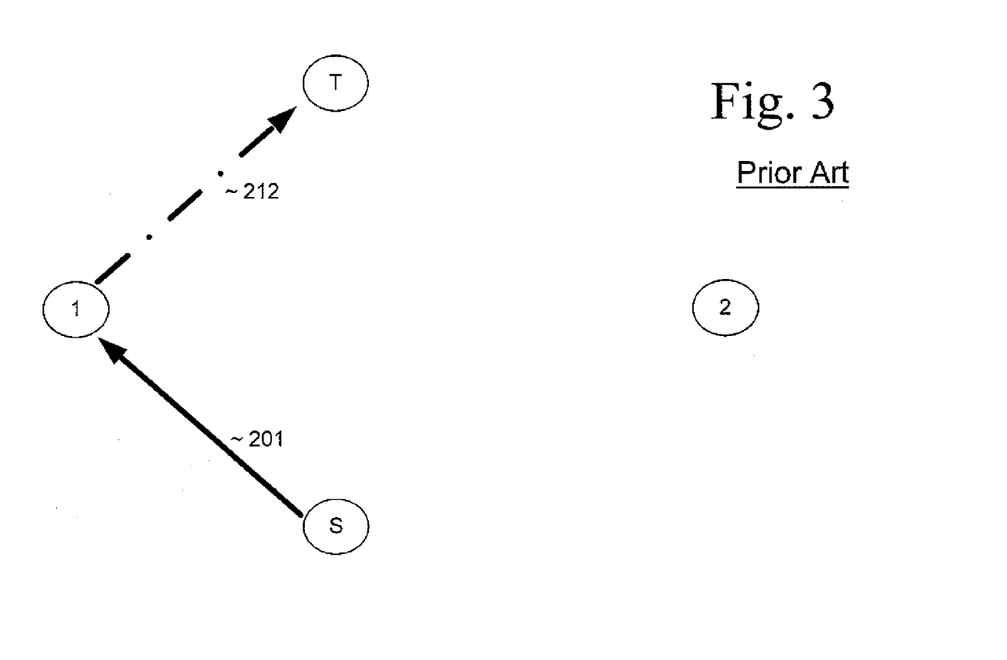
FIG. 3 is a block diagram illustrating an embodiment of a system of nodes that maybe include a path in accordance with the DSR or the disclosed subject matter.

Block 170 of FIG. 1, illustrates that if the receiving node is the target node the target node may place the most recent path segment in the route record of the routine request and send a the route reply, which includes the complete path between source and destination, to the source node. In the example illustrated by FIG. 2, upon receiving broadcast 212, node T would place the path segment 1:T in the route reply. The route reply may contain the segments S:1 and 1:T. The target node may transmit the route record to node S, by sending a signal via path segments, T:1 and then 1:S. It is important to note that while the path segments are noted, in some embodiments, as having a direction from the source node to the target node, the communication is not limited to uni-directional communication. The communication is often bi-directional, in some embodiments, by reversing the order of the path segments. Of course other techniques for bi-directional communication may be utilized Block 180 of FIG. 1 illustrates that the source node may determine if the received path in the route reply is the first received path between the source and target nodes. If not, Block 196 illustrates that the route record may be ignored. Block 193 illustrates that if the path is the first received path, the source node may utilize the path for further communication between the source and target nodes. However, in some embodiments, other techniques may be used to determine if the route record will be used. In the example illustrated by FIG. 2, if the route record including path segments S:1 and 1:T is the first path received by node S, the resulting communication path between node S & T may only include node 1. An example of the resulting path is shown in FIG. 3.

Figure 4:
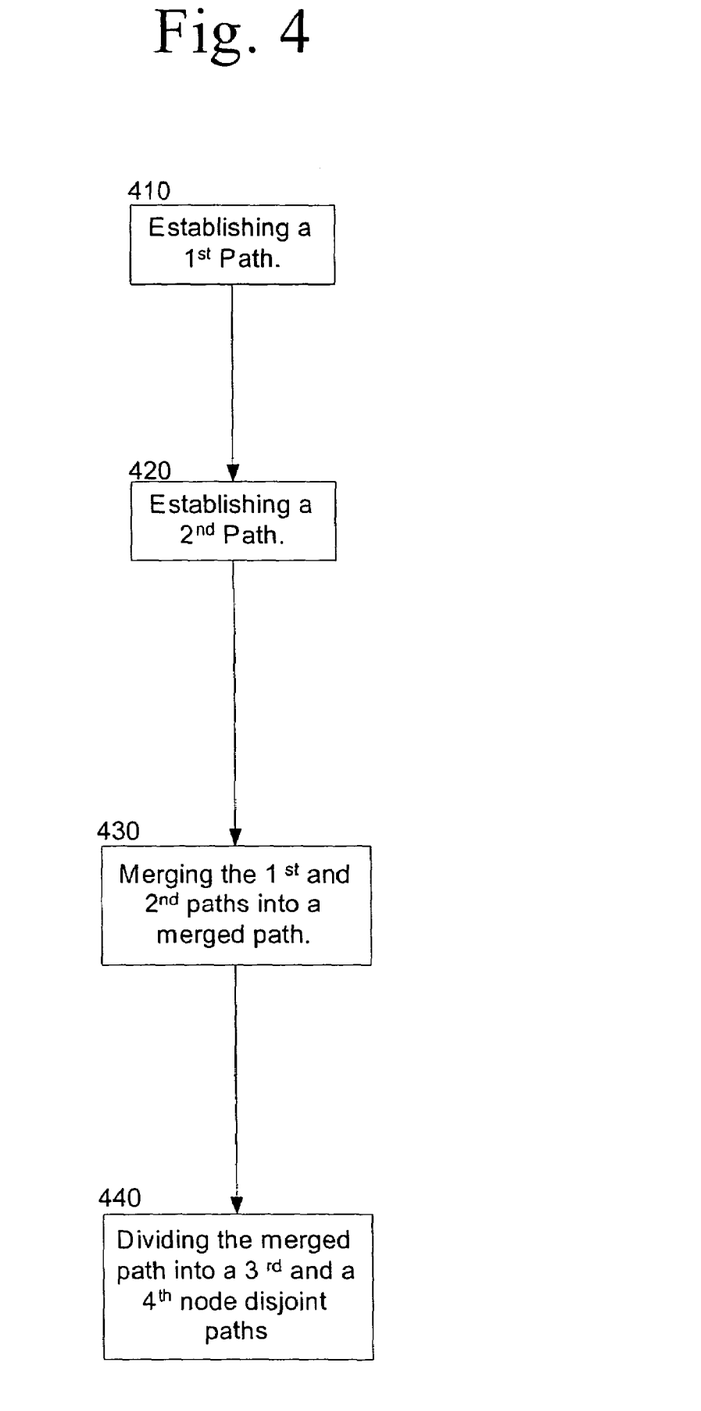
FIG. 4 is a flowchart illustrating an embodiment of a technique for establishing at least two node disjoint paths in accordance with the disclosed subject matter.
Figure 5:
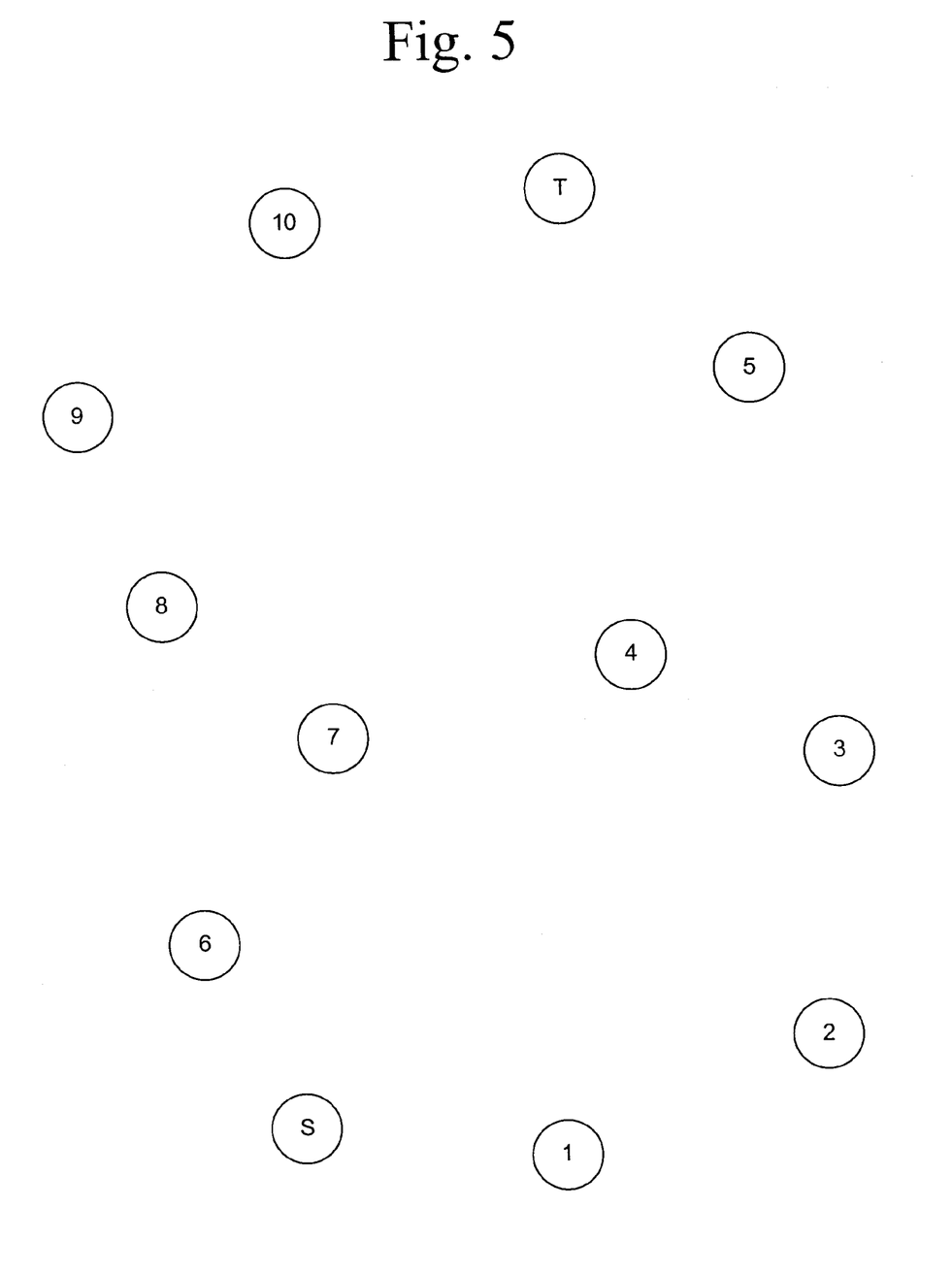
FIG. 5 is a block diagram illustrating an embodiment of a system of nodes that maybe include at least two node disjoint paths in accordance with the disclosed subject matter.

FIG. 4 is a flowchart illustrating an embodiment of a technique for establishing at least two node disjoint paths in accordance with the disclosed subject matter. FIG. 5 is a block diagram that illustrates a system of nodes that may be used to perform a technique in accordance with the disclosed subject matter. The system may include a source node S, a target node T, and various intermediate nodes 1 through 10.

Figure 6:
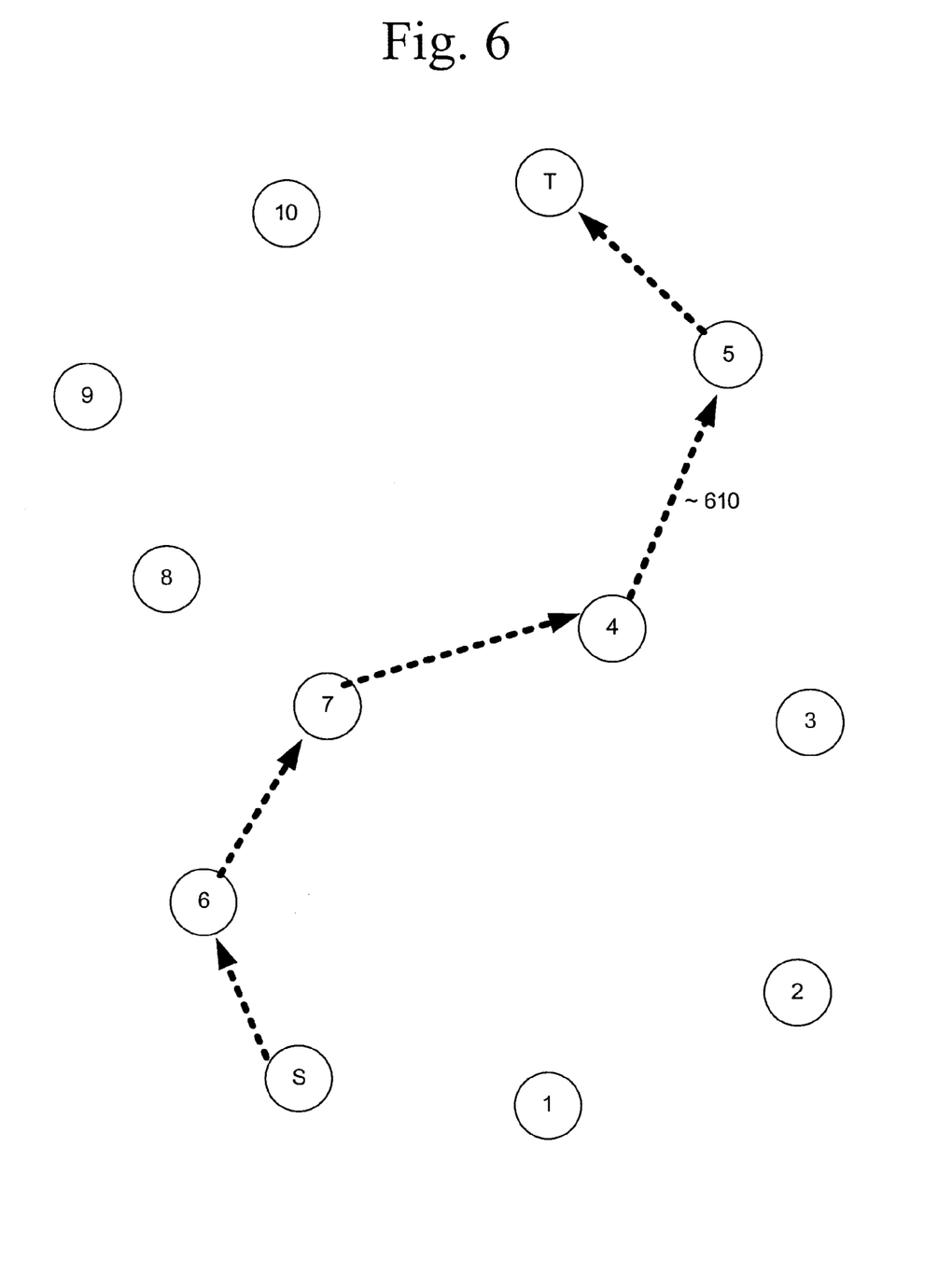
FIG. 6 is a block diagram illustrating an embodiment of a system of nodes that maybe include at least two node disjoint paths in accordance with the disclosed subject matter.
Figure 8:
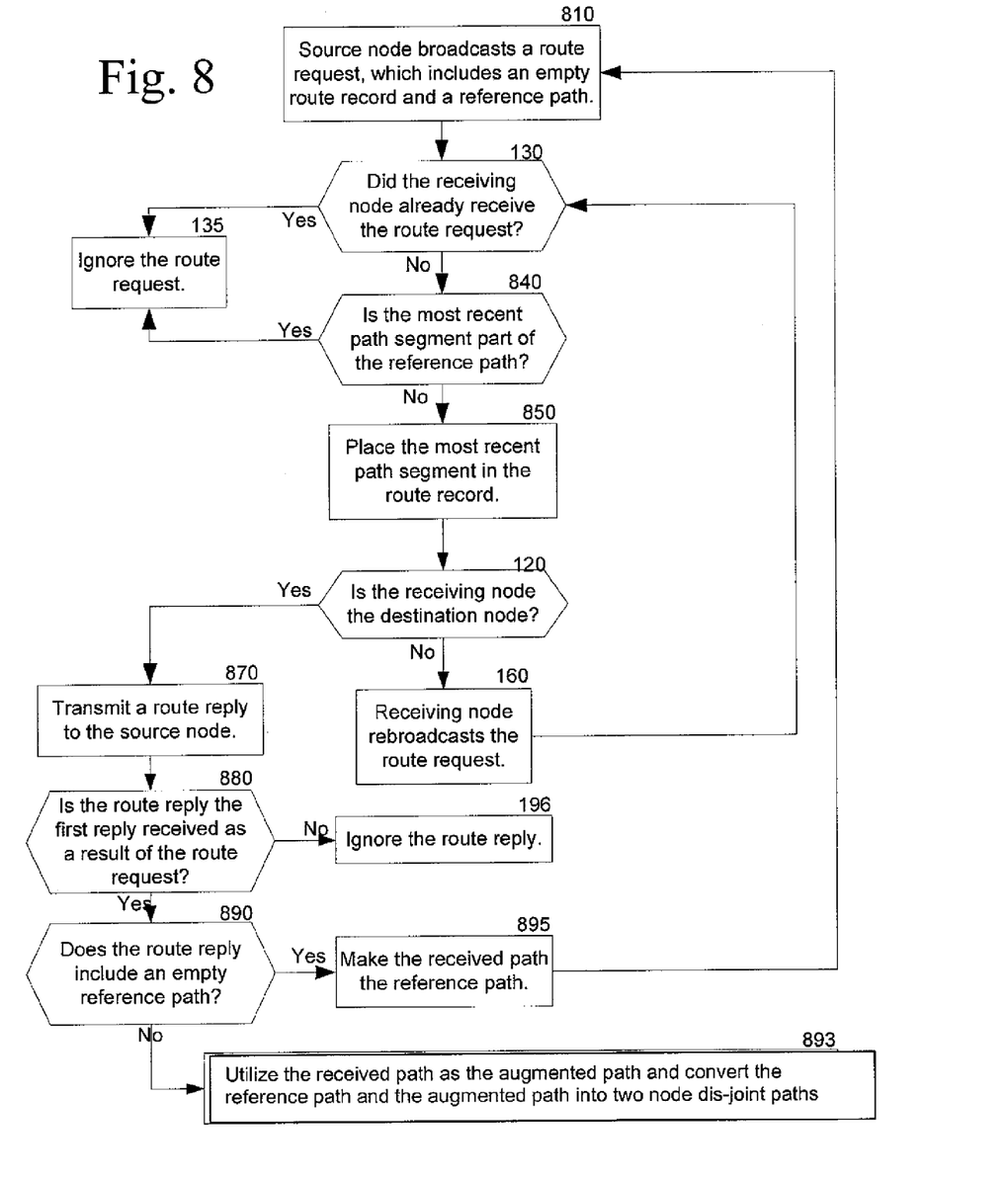
FIG. 8 is a flowchart illustrating an embodiment of a technique for establishing a communication path that may be used in accordance with the disclosed subject matter.

In one embodiment, the technique may include block 410 of FIG. 4 that illustrates that a first path between a source node and a target node may be established. In one embodiment, this embodiment may include a number of direction based path segments. FIG. 6 illustrates that this path 610 may established between nodes S and T. This path may include a plurality of path segments, such as, for example, path segments S:6, 6:7, 7:4, 4:5, and 5:T. These path segments may be considered direction based as path segment S:6 denotes that communication from node S to node T flows, in part, from node S to node 6. In one embodiment, the technique illustrated by block 410 of FIG. 4 may utilize a commonly known technique, such as, for example, Dynamic Source Routing (DSR) protocol that is illustrated by FIG. 1 and described in detail above. In another embodiment, the technique illustrated by block 410 of FIG. 4 may utilize another technique, such as, for example, the Generic Routing Discovery Procedure (GRDP) that is illustrated by FIG. 8 and described below. However, it is contemplated that other techniques may be used.

Figure 7:
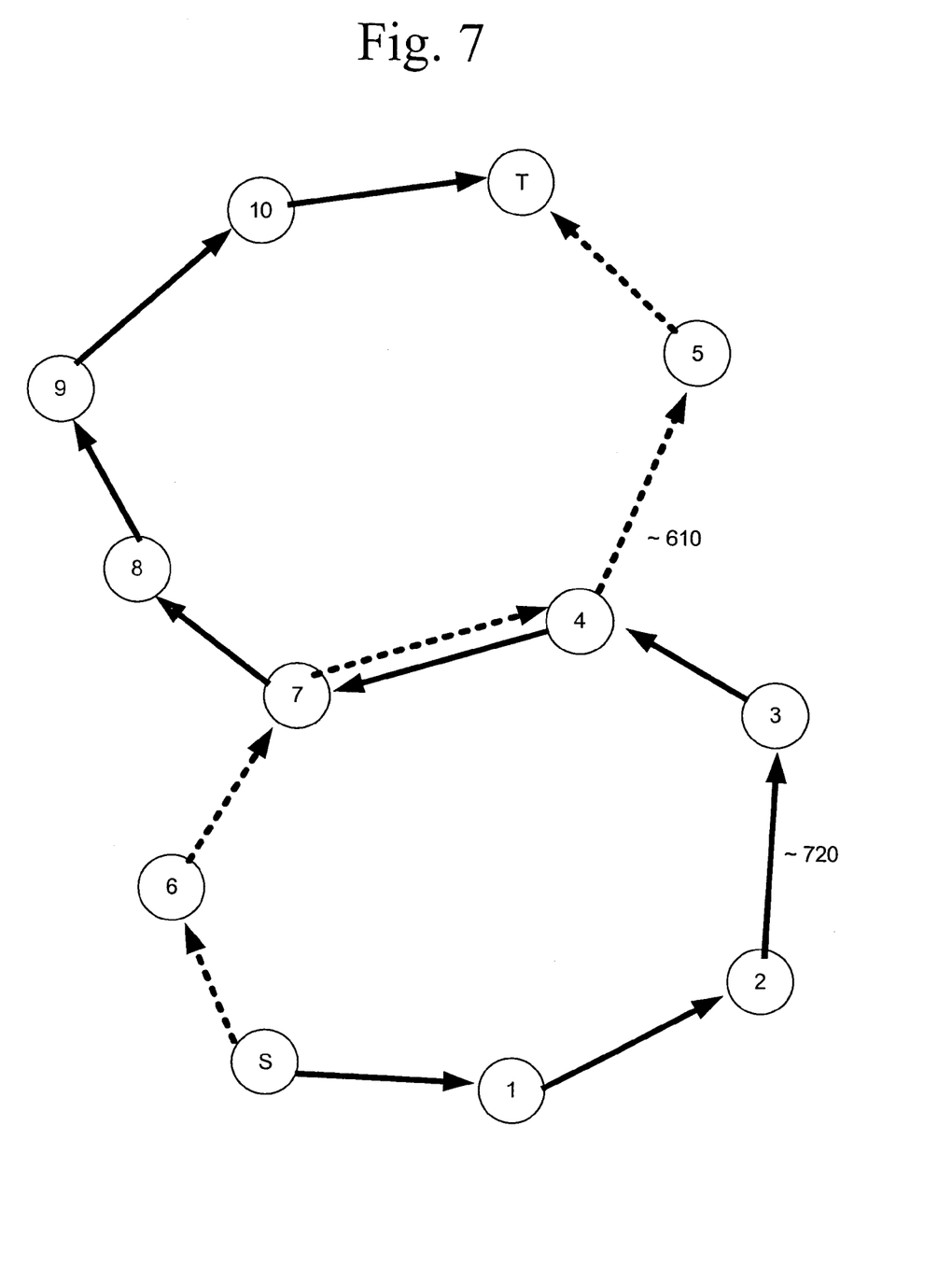
FIG. 7 is a block diagram illustrating an embodiment of a system of nodes that maybe include at least two node disjoint paths in accordance with the disclosed subject matter.

Block 420 of FIG. 4 illustrates that a second path may be established. FIG. 7 illustrates that second, or augmented, path 720 may be established. In one embodiment, this second path may be established utilizing a modified Routing Discovery Procedure (RDP) protocol. The RDP protocol, in one embodiment, may be modified to include information about the first path and preventing the second path from including path segments found in the first path.

FIG. 8 illustrates an embodiment of a technique for a Generic Routing Discovery Procedure (GRDP) protocol. Block 810 illustrates that the source node may broadcast with a route request that includes a reference path. In one embodiment, if the GRDP is being used to fulfill block 420 of FIG. 4, the reference path may include the first route record created, for example, during block 410 of FIG. 4. Conversely, if the GRDP is being used in one embodiment of block 410 of FIG. 4, the reference path may be empty or null.

The technique illustrated by FIG. 8 may, in one embodiment, continue in much the same fashion as FIG. 1. Blocks 120 and 130 are described above in reference to FIG. 1. Block 840 illustrates that the receiving node may additionally determine if the most recent path segment is part of the reference path. If so, the route request may be ignored, as illustrated by block 135. If not, the request may continue to be processed. The path segment may be placed in the route record, block 850, and retransmitted, block 160.

When the route request has reached the target node, the route record may be transmitted to the source node via a route reply, block 870. In some embodiments this may be in done substantially the same manner as described above in regards to FIG. 1.

Block 880 illustrates that the source node may determine if the route reply is the first route reply received as a result of this route request. If not, the route reply may be ignored, block 196. If so, the source node may determine if the route reply resulted from a route request that included an empty reference path, block 890. In one embodiment, the source node may do this by determining if the route reply includes an empty reference path, as illustrated by FIG. 8. In another embodiment, the determination may involve the source node caching the reference path and determining if that cache is empty after the route reply has been received. Of course, these are merely two illustrative examples of the disclosed subject matter and other techniques are within the scope of the disclosed matter.

Block 893 illustrates that, if the reference path was not empty, the received path from the route reply may be used as the augmented path. The augmented and reference paths may then be converted into two node disjoint paths, as illustrated in Blocks 430 and 440 of FIG. 4 and described in detail below.

Block 895 of FIG. 8, illustrates that if the reference path was empty (as would be the case if the GRDP was utilized in one embodiment of block 410 of FIG. 4), the received path may be used as the reference path and a second route request may be broadcast. This second route request may result in the discovery of a second or augmented path. In one embodiment, in addition to using the received path as a reference path, the received path may be stored of cached within the source node, and referred to as the "cached path."

In an illustrative example illustrated by FIG. 2, if the first path includes path segments S:1 and 1:T, node S may broadcast a request to establish an augmented or secondary path that utilizes node 2. The resulting augmented path may include path segments S:2 and 2:T. Another illustrative embodiment may be seen in FIG. 7. A first path 610, which may be the shortest path between nodes S and T, may be established. An augmented path 720 may then be established, based upon reference path 610, between nodes S and T.

In one embodiment, both paths may be established utilizing an "on-demand flooding scheme." That is they are established only when needed (i.e. on-demand). In another embodiment, the two paths may be established either substantially simultaneously or sequentially. However, these are merely a few illustrative embodiments and other embodiments are considered.

Figure 9:
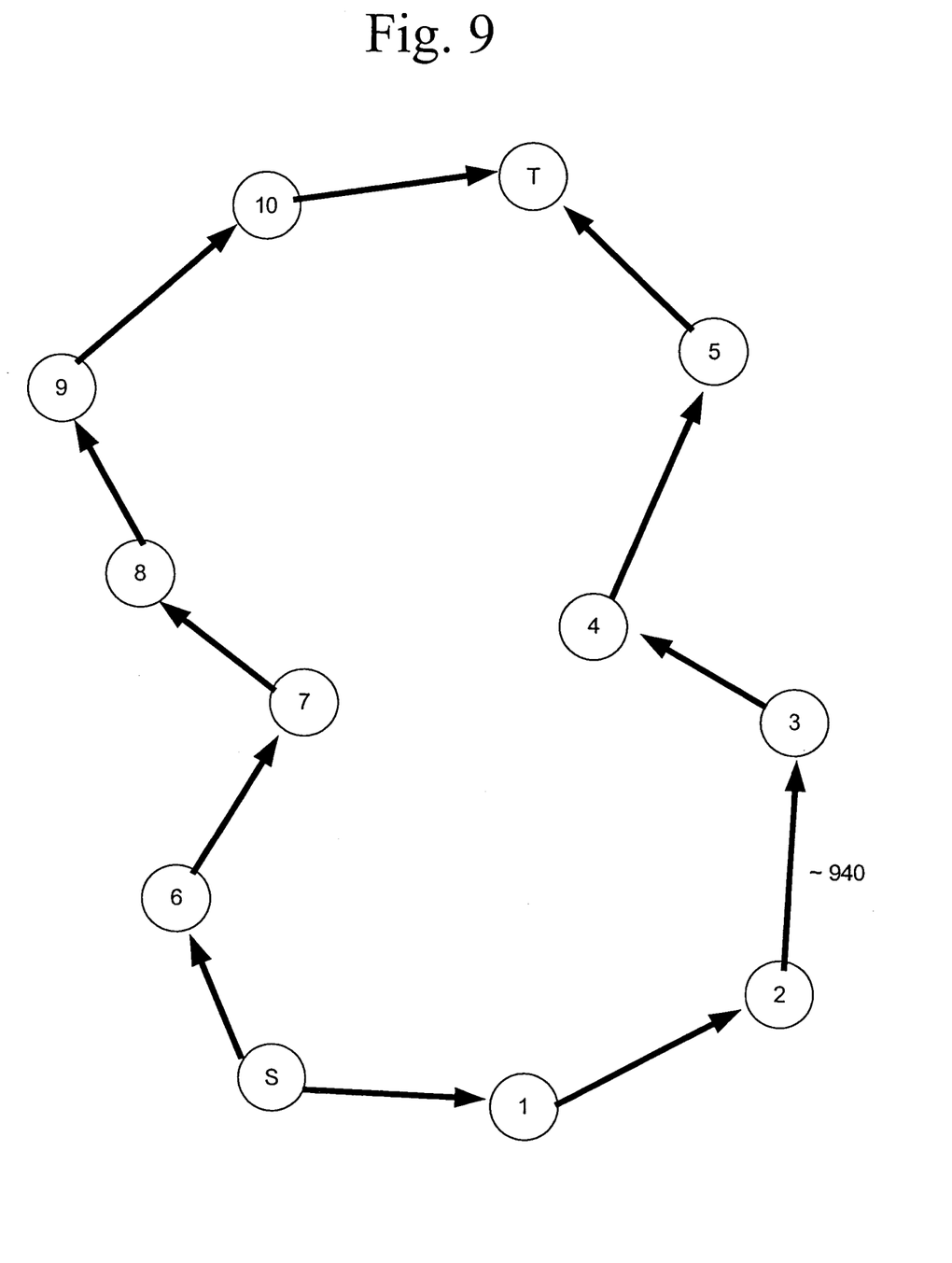
FIG. 9 is a block diagram illustrating an embodiment of a system of nodes that maybe include at least two node disjoint paths in accordance with the disclosed subject matter.
Figure 10:
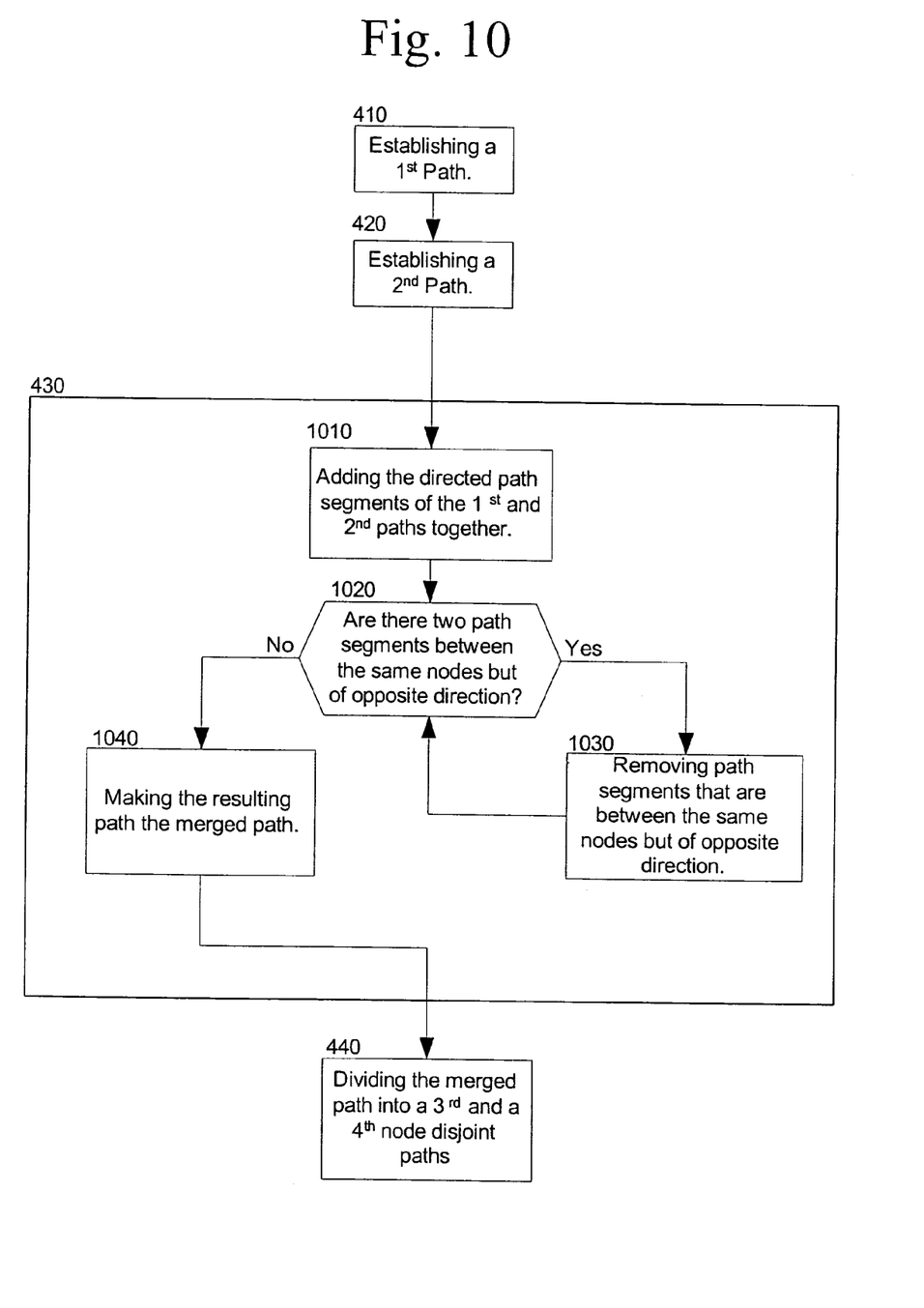
FIG. 10 is a flowchart illustrating an embodiment of a technique for establishing at least two node disjoint paths in accordance with the disclosed subject matter.
Figure 11:
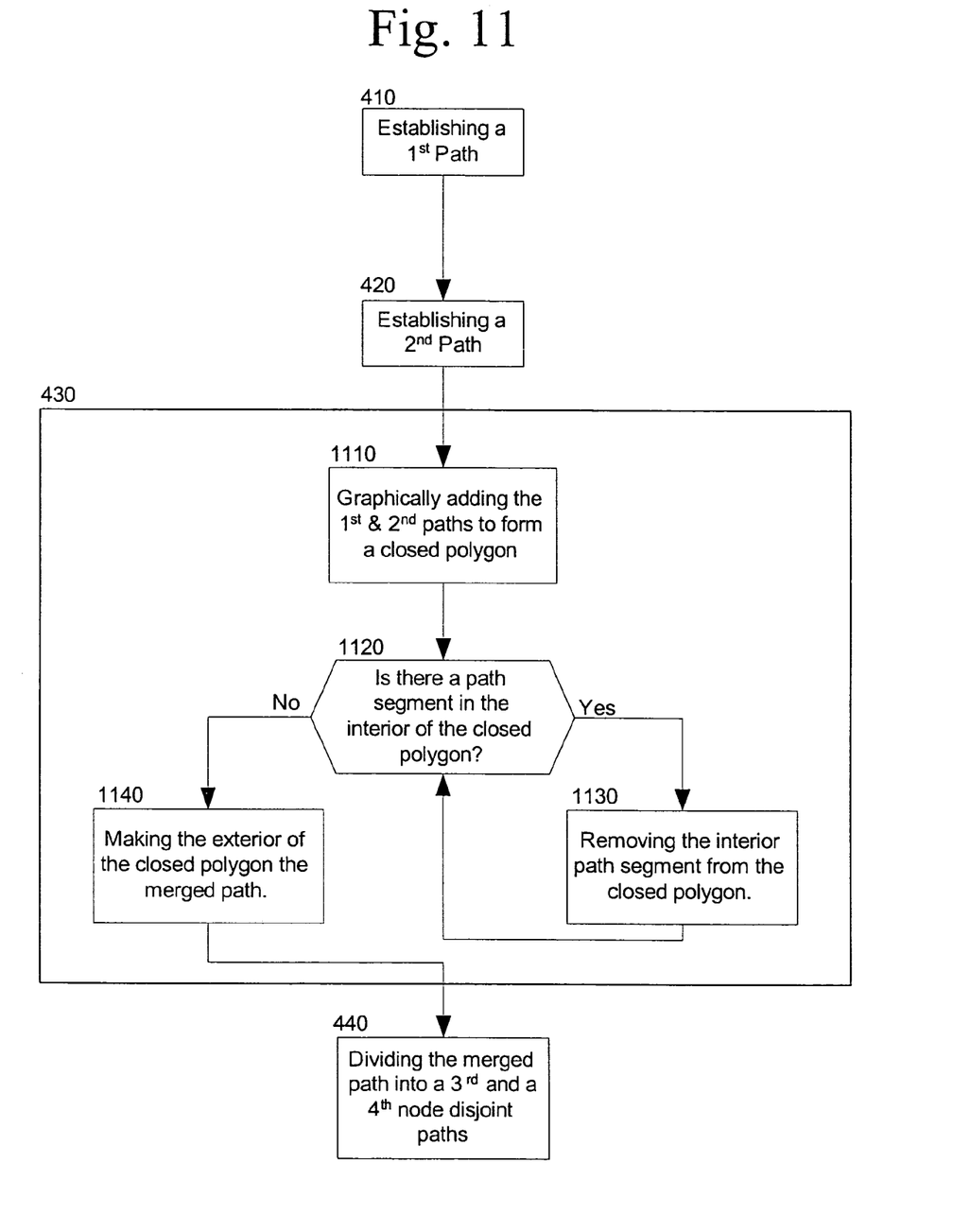
FIG. 11 is a flowchart illustrating an embodiment of a technique for establishing at least two node disjoint paths in accordance with the disclosed subject matter.

Returning to FIG. 4., Block 430 illustrates that the first and second paths may be combined to form a merged path. FIG. 9 is a block diagram illustrating a merged path 940 that may result from some embodiments of the disclosed subject matter. FIGS. 10 and 11 illustrate two embodiments of techniques to combine the first and second paths; however, other embodiments are contemplated.

In the one embodiment, detailed in FIG. 10, block 430 of FIG. 4 may involve the additional illustrated blocks. Block 1010 of FIG. 10 illustrates that the path segments of the first and second paths may added together. Block 1020 illustrates determining if there are any path segments between the same node pairs but of opposite directions. Block 1030 illustrates that path segments between equivalent nodes but of opposite direction may be removed from the merged path. In an illustrative example, FIG. 7 illustrates two path segments between equivalent nodes but of opposite direction. The path segments 4:7 and 7:4 are both between the fourth and seventh nodes; however they are of opposite direction and would cancel out and, therefore, be removed from the merged path. Blocks 1020 and 1030 of FIG. 10 may-be repeated until all such path segments are removed from the resulting path. It is contemplated that some embodiments may merge blocks 1010, 1020, and 1030 into a common block. For example, vector addition may inherently reduce opposite directional path segments to zero. However, other techniques are within the scope of the disclosed subject matter. Block 1040 illustrates making the resulting path the merged path. FIG. 9 illustrates the resulting merged path 940.

In another embodiment, detailed in FIG. 11, block 430 of FIG. 4 may involve the additional illustrated blocks. Block 1110 of FIG. 11 illustrates that the first and second paths may be added together in a graphical fashion. The first and second paths may form a closed polygon. Block 1120 illustrates determining if the interior of the closed polygon includes any path segments. Block 1130 illustrates that, in one embodiment, the interior path segments of the closed polygon may be removed. In an illustrative example, FIG. 7 illustrates two path segments within the interior path segments of the closed polygon. The path segments 4:7 and 7:4 are both between the fourth and seventh nodes; however they are of within the interior of the resulting closed polygon formed by the combination of paths 610 and 720., and, therefore, be removed from the merged path. Blocks 1120 and 1130 of FIG. 11 may be repeated until all such path segments are removed from the resulting path. It is contemplated that some embodiments may merge blocks 1110, 1120, and 1130 into a common block. Block 1140 illustrates making the resulting path the merged path. FIG. 9 illustrates the resulting merged path 940.

Figure 12:
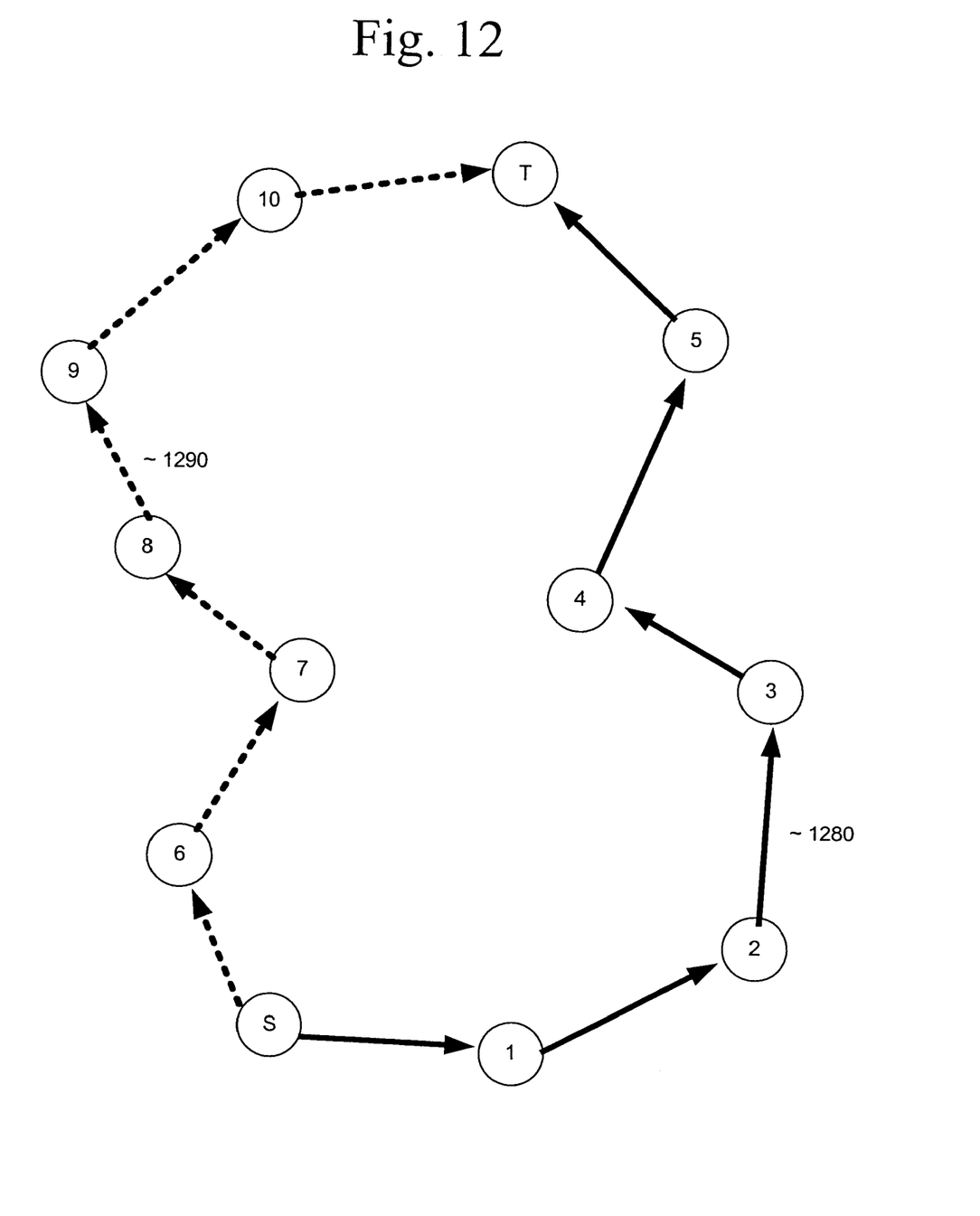
FIG. 12 is a block diagram illustrating an embodiment of a system of nodes that maybe include at least two node disjoint paths in accordance with the disclosed subject matter.

Block 440 of FIG. 4 illustrates that the merged path may be divided into a third and fourth path. These third and fourth paths will be node disjoint, i.e. no node, aside from the source and target nodes, may be simultaneously part of the third and fourth paths. FIG. 12 illustrates how the merged path 940 of FIG. 9 may be divided into two node disjoint paths. Paths 1280 and 1290 of FIG. 12 allow communication between nodes S and T. It is noted that while the paths are illustrated as going from source node to target node, the communication path may be bidirectional. It is contemplated that one embodiment of the disclosed subject matter, the technique illustrated by FIG. 4 may be repeated as needed to establish a plurality of node disjoint paths.

Figure 13:
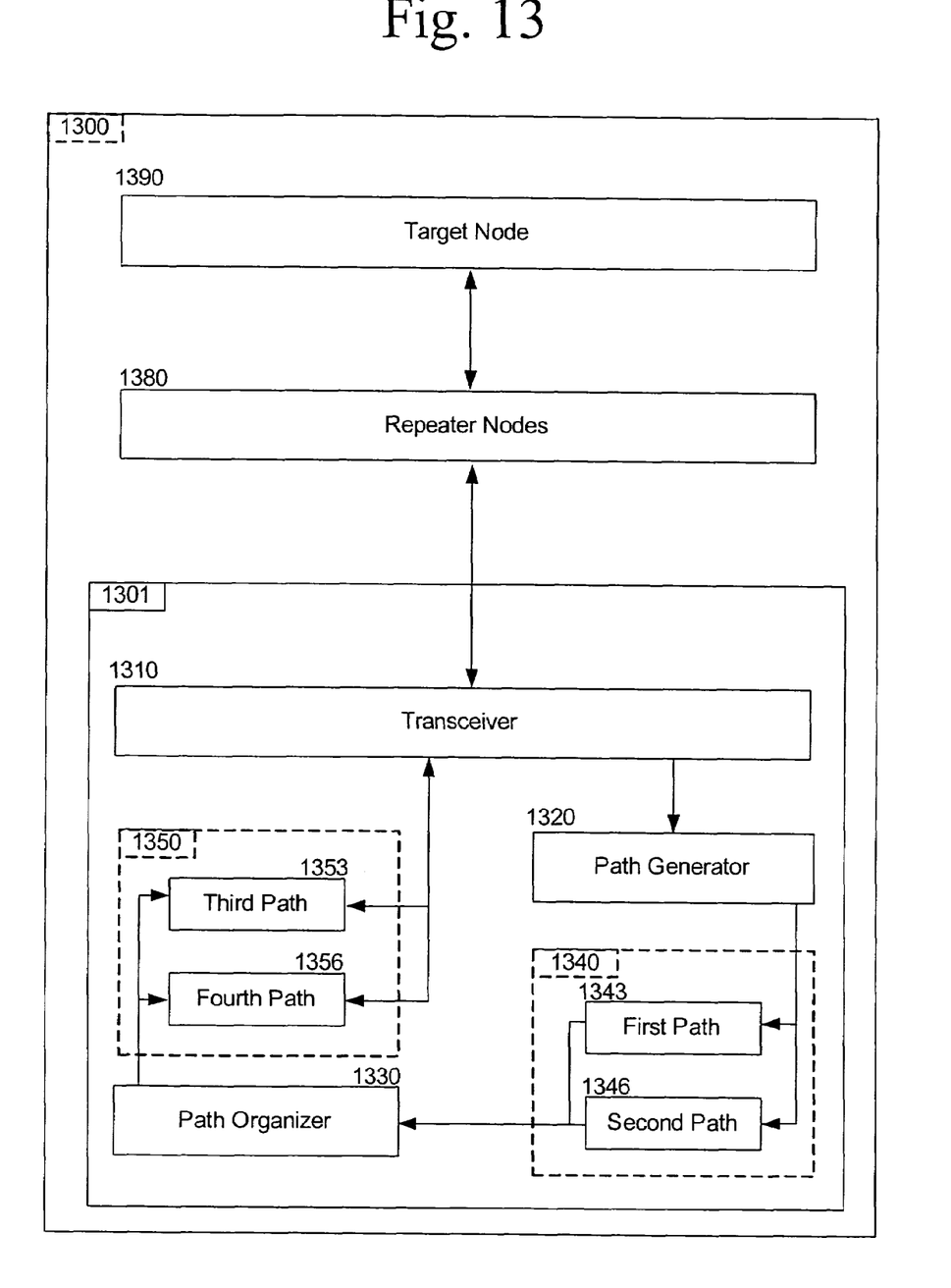
FIG. 13 is a block diagram illustrating an embodiment of an apparatus and a system that allows for establishing at least two node disjoint paths in accordance with the disclosed subject matter.

FIG. 13 is a block diagram illustrating an embodiment of an apparatus 1301 and a system 1300 that allows for establishing at least two node disjoint paths in accordance with the disclosed subject matter. An apparatus may include a transceiver 1310, path generator 1320, and path organizer 1330.

Transceiver 1310 may be capable of transmitting and receiving a wireless signal. The wireless signal may be transmitted to, in one embodiment, other parts of the system 1300. The system may include the apparatus 1301, a number of repeater or intermediate nodes 1380, and the target node 1390.

Path generator 1320 may be capable of establishing at least one path of communication, utilizing a wireless signal between the apparatus or source node and a target node. In one embodiment, the path generator may be capable of establishing first and second paths utilizing the technique described above in reference to blocks 410 and 420 of FIG. 4. In another embodiment, the first path 1343 and second path 13946, may be stored in a memory 1340.

Path Organizer 1320 may be capable of arranging a first set of paths, first path 1343 and second path 1346, into a second set of paths, third path 1353 and fourth path 1356, that are node disjoint. In one embodiment, the path organizer may establishing a third and fourth paths utilizing the technique described above in reference to blocks 430 and 440 of FIG. 4. In another embodiment, the third path 1353 and second path 1356, may be stored in a memory 1350.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the disclosed subject matter have been illustrated and described herein, many modifications, substitutions, changes, and equivalents will now occur to those skilled in the art. It is, therefore, to be understood that the appended claims are intended to cover all such modifications and changes that fall within the true spirit of the disclosed subject matter.

What is claimed is:

1. A method of establishing at least two node-disjoint paths comprising:
   establishing, by a source node, a first directed path, having direction based path segments, from the source node to a target node;
   establishing, by the source node, a second directed path, having direction based path segments, from the source node to the target node;
   merging, by the source node, the first and second directed paths into a merged path, the merging including adding the first directed path to the second directed path in such a manner that the direction based path segments of opposite direction are removed from the merged path, the adding including
   determining if two path segments are between same nodes but of opposite direction,
   if so, removing both path segments from the merged path, and
   repeating the determination and removal until all such paths segments are removed from the merged path; and
   dividing, by the source node, the merged path into a third and a fourth node-disjoint directed paths between the source node and the target node.

2. The method of claim 1, wherein establishing the first directed path includes utilizing either a Generic Route Discovery Procedure or a Dynamic Source Routing protocol.

3. The method of claim 2, wherein establishing the second directed path includes utilizing the Generic Route Discovery Procedure.

4. The method of claim 3, wherein utilizing the Generic Route Discovery Procedure includes:
   broadcasting a route request;
   broadcasting information about the first directed path with the route request;
   forwarding the route request via receiving nodes until the request is received by the target node;
   building the second directed path having path segments utilizing the path segments that the route request has traveled; and
   preventing the second directed path from including directed path segments found in the first directed path.

5. The method of claim 1, wherein establishing the first directed path and establishing the second directed path each include
   broadcasting an on-demand flooding route request.

6. The method of claim 1, wherein establishing the first directed path and establishing the second directed path occur substantially simultaneously.

7. The method of claim 1, wherein adding the first directed path to the second directed path includes utilizing a substantially vector based addition.

8. The method of claim 1, wherein the two-node disjoint paths include both wireless path segments and wired path segments.

9. A source node comprising:
   a transceiver to transmit and receive a wireless signal;
   a path generator to establish at least a first plurality of paths of communication, utilizing at least in part the wireless signal, between the source node and a target node, the first plurality of paths including a plurality of directed paths, each directed path having direction based path segments;
   a path organizer to arrange the first plurality of paths generated by the path generator into a second plurality of paths that are node disjoint, the arranging including combining the first plurality of paths into a merged path and dividing the merged path into the second plurality of paths, the combining including adding the first set of paths together, such that path segments of opposite directions cancel out, the combining further utilizing a substantially vector based addition.

10. The source node of claim 9, wherein the path generator is further to generate a first directed path and a second directed path, each directed path having direction based path segments.

11. The source node of claim 10, wherein the path generator is further to generate a path utilizing a Generic Route Discovery Procedure.

12. The source node of claim 9, wherein the path generator is further to generate:
   a first path utilizing the Generic Route Discovery Procedure utilizing an empty reference path, and
   a second path utilizing the Generic Route Discovery Procedure utilizing the first path as the reference path.

13. The source node of claim 9, wherein the path generator is further to generate a second path via:
   broadcasting a route request;
   broadcasting information about a first directed path with the route request;
   directing receiving nodes to forward the route request via receiving nodes until the request is received by the target node;
   directing receiving nodes to build a second directed path having path segments utilizing the path segments that the route request has traveled; and
   directing receiving nodes to prevent the second directed path from including directed path segments found in the first directed path.

14. The source node of claim 13, wherein the path generator is further to:
   establish the first and second paths substantially simultaneously.

15. The source node of claim 9, wherein the path organizer is further to:
  determine if two path segments are between the same nodes but of opposite direction;
  if so, remove both path segments from the merged path; and
  repeat the determination and removal until all such paths segments are removed from the merged path.

16. The source node of claim 9, wherein the transceiver is further to send the wireless signal to the target node utilizing any one of the paths of the second plurality of paths that are node disjoint.

17. An article of manufacture comprising:
  a storage medium; and
  a plurality of machine accessible programming instructions stored on the storage medium and configured to program a node to:
    establish a first directed path, having direction based path segments, from a source node to a target node;
    establish a second directed path, having direction based path segments, from the source node to the target node;
    merge the first and second directed paths into a merged path, the merging including adding the first directed path to the second directed path to form a closed polygon, and removing any interior path segments from the closed polygon, wherein the merged path is the exterior path segments of the closed polygon; and
    divide the merged path into a third and a fourth node-disjoint directed paths.

18. The article of claim 17, wherein the programming instructions are configured to establish the first directed path, and said establishing the first directed path further includes utilizing either a Generic Route Discovery Procedure or a Dynamic Source Routing protocol.

19. The article of claim 18, wherein the programming instructions are configured to establish the second directed path, and said establishing the second directed path further includes utilizing the Generic Route Discovery Procedure.

20. The article of claim 19, wherein the programming instructions are configured to utilize the Generic Route Discovery Procedure, and said utilizing includes:
  broadcasting a route request;
  broadcasting information about the first directed path with the route request;
  forwarding the route request via receiving nodes until the request is received by the target node;
  building the second directed path having path segments utilizing the path segments that the route request has traveled; and
  preventing the second directed path from including directed path segments found in the first directed path.

21. The article of claim 17, wherein the programming instructions are configured to establish the first directed path and establish the second directed path, and said establishing the first directed path and said establishing the second directed path each further include:
  broadcasting an on-demand flooding route request.

22. The article of claim 17, wherein the programming instructions are further configured to program the node to perform said establishing the first directed path and said establishing the second directed path substantially simultaneously.

23. The article of claim 17, wherein the programming instructions are configured to divide the merged path into the third and the fourth node-disjoint directed paths, and the dividing further includes:
  determining which path segments of the closed polygon would be traversed if a transmission occurred between the source node and the target node in a clock-wise direction;
  making the third path the clock-wise path segments; and
  making the fourth path the counter-clock wise path segments.

24. The article of claim 23, wherein the programming instructions are configured to divide the merged path into the third and the fourth node-disjoint directed paths, and the dividing further includes:
  creating the third path utilizing a first portion of the path segments from the first directed path and a first portion of the path segments from the second directed paths; and
  creating the fourth path utilizing a second portion of the path segments from the first directed path and a second portion of the path segments from the second directed paths.

25. The article of claim 17, wherein the two-node disjoint paths include both wireless path segments and wired path segments.

* * * * *